United States Patent
Scherman

(10) Patent No.: US 7,428,956 B2
(45) Date of Patent: Sep. 30, 2008

(54) AUGER ASSEMBLY

(75) Inventor: Patrick John Scherman, Battleford (CA)

(73) Assignee: Saskatchewan Ltd, Battleford, CA (US)

(*) Notice: Subject to any disclaimer, the term of this patent is extended or adjusted under 35 U.S.C. 154(b) by 82 days.

(21) Appl. No.: 11/056,144

(22) Filed: Feb. 14, 2005

(65) Prior Publication Data

US 2006/0180429 A1    Aug. 17, 2006

(51) Int. Cl.
| B65G 21/10 | (2006.01) |
| B65G 41/00 | (2006.01) |
| B65G 65/02 | (2006.01) |
| B65G 15/26 | (2006.01) |
| B65G 17/28 | (2006.01) |
| B65G 21/14 | (2006.01) |
| B65G 33/32 | (2006.01) |

(52) U.S. Cl. .................. 198/312; 198/313; 198/666
(58) Field of Classification Search .............. 198/312, 198/313, 581, 666, 668
See application file for complete search history.

(56) References Cited

U.S. PATENT DOCUMENTS

| 4,142,621 | A | * | 3/1979 | Oliver | 198/318 |
| 4,583,905 | A | * | 4/1986 | Scherr | 414/505 |
| 4,819,348 | A | * | 4/1989 | DeBolt | 37/350 |
| 4,936,066 | A | * | 6/1990 | Rutsche et al. | 52/238.1 |
| 4,963,066 | A | * | 10/1990 | Boppart | 414/376 |
| 5,129,502 | A | * | 7/1992 | Justice | 198/303 |
| 5,184,715 | A |   | 2/1993 | Feterl | |
| 5,234,094 | A |   | 8/1993 | Weyermann et al. | |
| 5,305,866 | A |   | 4/1994 | Stewart et al. | |
| 5,351,805 | A | * | 10/1994 | Miller et al. | 198/493 |
| 5,655,872 | A | * | 8/1997 | Plotkin | 414/526 |
| 5,788,055 | A |   | 8/1998 | Stewart et al. | |
| 6,119,847 | A | * | 9/2000 | Mooney et al. | 198/632 |
| 6,767,174 | B2 | * | 7/2004 | Cresswell | 414/523 |
| 6,805,229 | B2 | * | 10/2004 | Dekoning | 198/313 |

FOREIGN PATENT DOCUMENTS

| JP | 58163908 | 6/1983 |
| JP | 60056709 A | 4/1985 |

* cited by examiner

*Primary Examiner*—Gene O. Crawford
*Assistant Examiner*—Ramya G Prakasam
(74) *Attorney, Agent, or Firm*—Ryan W. Dupuis; Adrian D. Battison; Michael R. Williams

(57) ABSTRACT

An auger assembly transfers particulate material from a source area to a target area using a main auger, an intermediate swing auger and a loading swing auger connected in series with one another. The main auger is supported on a wheeled frame similar to conventional grain augers while the intermediate swing auger is pivotal thereon and the loading swing auger is pivotal on the intermediate swing auger. The inlet hopper of the auger assembly can thus be more easily positioned relative to the main auger for proper alignment with the discharge hopper of a particulate material container even when the discharge hopper is within a confined space.

21 Claims, 6 Drawing Sheets

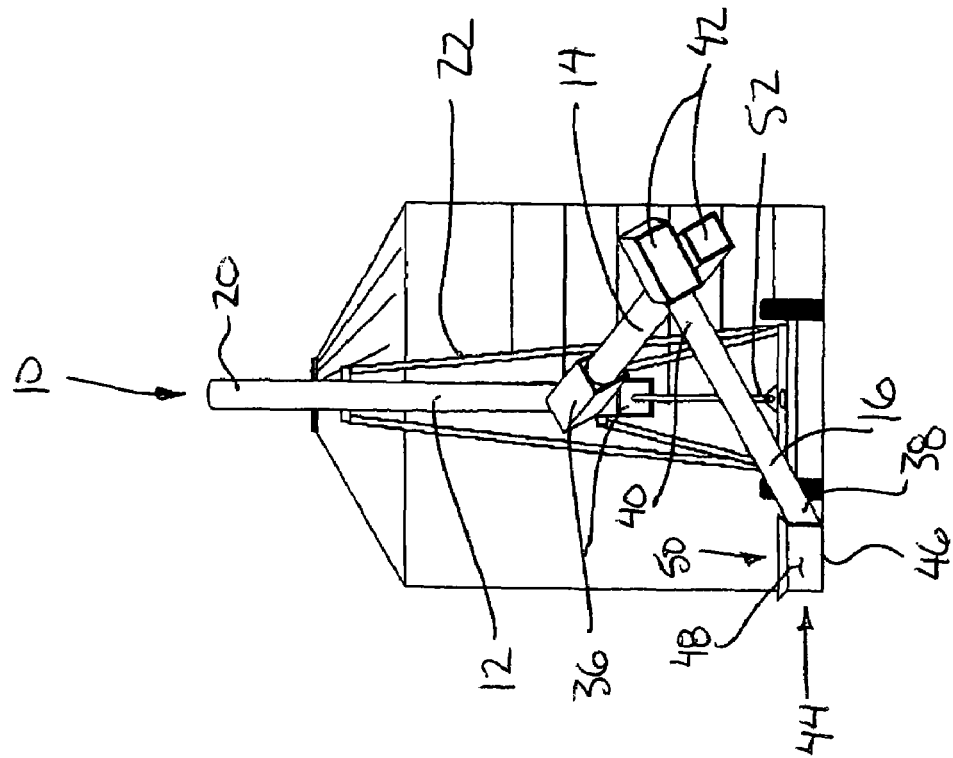
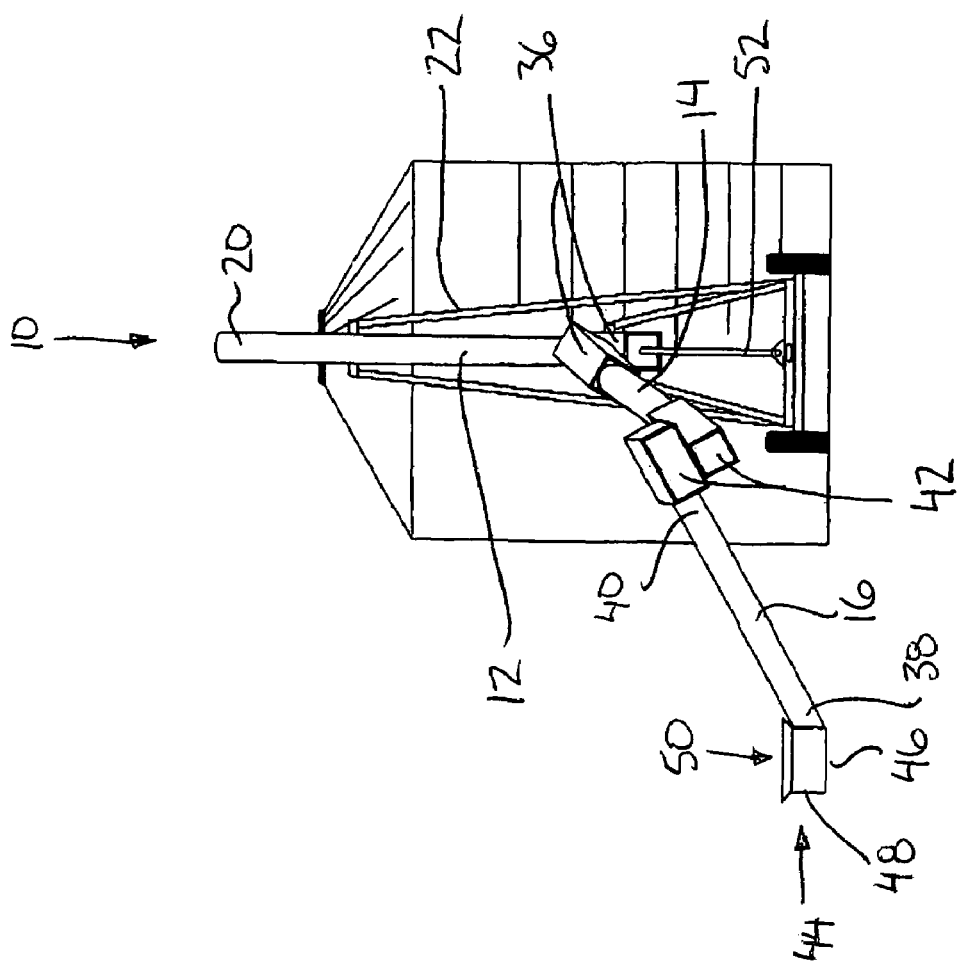

AUGER ASSEMBLY

FIELD OF THE INVENTION

The present invention relates to an auger assembly of the type commonly used for conveying particulate material, for example grain and the like, and more particularly relates to an auger assembly having auger tubes which are pivotal relative to one another.

BACKGROUND

It is common to use grain augers and the like to transfer grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

U.S. Pat. No. 5,184,715 to Feterl, U.S. Pat. No. 5,305,866 and U.S. Pat. No. 5,788,055 both to Stewart et al and U.S. Pat. No. 4,963,066 to Boppart disclose various examples of grain augers used for conveying particulate materials. In each instance a main auger is supported on a wheeled frame for positioning of the discharge in alignment with the target area. A swing auger is provided at the inlet of the main auger for alignment with the source area. The hopper at the inlet of the swing auger however is restricted to positioning along an arced path which is difficult to align with the discharge hopper of a transport container. Often due to the narrow space between wheel sets within which a discharge hopper on a transport container is located, it is not possible to displace the swing auger is an arcing motion under the transport container parked beside the main auger without multiple steps of advancing and subsequent reversal of the vehicle position for proper alignment with the discharge hopper on the vehicle with the inlet hopper on the swing auger. The swing augers are thus difficult and time consuming to set up and may result in lost material being transferred due to its poor alignment.

On a much larger scale, for example when excavating earth in mines and the like, large conveyor systems can be used which involve multiple conveying sections connected in series as exemplified by U.S. Pat. No. 5,234,094 to Weyerman et al which discloses such a conveyor system. These conveyor systems however are much too large with far too many sections for the simple task of effectively transferring material from a small source such as a transport container to a suitable storage container at the target area with minimal set up time required.

SUMMARY OF THE INVENTION

According to one aspect of the invention there is provided an auger assembly comprising:

a main auger tube containing a main auger therein to transport material from an inlet end to an outlet end of the main auger tube;

an intermediate swing auger tube containing an intermediate auger therein to transport material from an inlet end to an outlet end of the intermediate swing auger tube;

the outlet end of the intermediate swing auger tube being pivotally coupled to the inlet of the main auger tube such that material from the intermediate swing auger tube is discharged to the main auger tube;

a loading swing auger tube containing a loading auger therein to transport material from an inlet end to an outlet end of the loading swing auger tube;

the outlet end of the loading swing auger tube being pivotally coupled to the inlet of the intermediate swing auger tube such that material from the loading swing auger tube is discharged to the intermediate swing auger tube; and a loading hopper having an open top end coupled to the inlet of the loading swing auger tube for loading the material through the open top end of the loading hopper.

According to a second aspect there is provided a method of transferring particulate material from a source area to a target area, the method comprising:

providing an auger assembly including a main auger, an intermediate auger and a loading auger connected in series with one another in which the main auger is supported on a main frame, the intermediate auger is pivotal relative to the main auger and the loading auger is pivotal relative to the intermediate auger;

aligning an outlet end of the main auger with the target area;

positioning an inlet end of the loading auger below the source area by pivoting both the loading auger relative to the intermediate auger and the intermediate auger relative to the main auger; and driving rotation of the augers to convey the particulate material from the inlet of the loading auger to the outlet of the main auger.

The combination of a single main auger with only two swing augers is particularly suited for proper alignment of the inlet hopper with the discharge of a transport container unlike prior art auger assemblies which rely on a single swing auger configuration. By combining two swing augers, the inlet hopper is permitted to be placed any number of positions in all directions relative to the inlet of the main auger once the main auger is already in alignment with the target area.

There may be provided gearboxes coupling the main auger to the intermediate auger and coupling the intermediate auger to the loading auger such that the augers are commonly driven. Preferably the main auger is connected to an input drive shaft having a power take off coupling for driving the main auger directly. The intermediate auger and the loading auger can thus be driven off rotation of the main auger through the gearboxes.

Preferably the main auger tube is supported on a wheeled frame having a hitch and is much longer than the intermediate swing auger tube and the loading swing auger tube combined.

The loader hopper preferably includes an enclosed bottom and side walls extending upwardly to the open top end. The loader hopper can be supported adjacent the ground by supporting the loading swing auger tube substantially below the main auger tube in elevation.

Pivotal movement of the intermediate swing auger tube relative to the main auger tube is preferably restricted about one axis and may be power assisted by providing a hydraulic actuator coupled between the intermediate swing auger tube and the main auger tube.

Preferably pivotal movement between the intermediate swing auger tube and the loading swing auger tube is permitted freely about at least two axes.

The intermediate swing auger tube may be supported for pivotal movement across the hitch, but the inlet of the loading swing auger tube is preferably lower in elevation than the hitch.

The swing auger tubes may be pivotal into a transport position in which the intermediate swing auger tube and the main auger tube are positioned end to end substantially in the longitudinal direction and the loading swing auger tube extends alongside the intermediate swing auger tube from the inlet of the intermediate swing auger tube towards the main auger tube.

In addition, the swing auger tubes may be pivotal into a loading position in which the loading swing auger tube extends across the frame in a loading direction perpendicularly to the longitudinal direction of the main auger tube in which the loading swing auger tube is movable in the loading direction by pivoting the intermediate swing auger tube relative to the main auger tube.

The intermediate swing auger tube and the main auger tube are preferably parallel with one another when oriented in a generally common vertically plane.

One embodiment of the invention will now be described in conjunction with the accompanying drawings in which:

BRIEF DESCRIPTION OF THE DRAWINGS

FIG. 2 and FIG. 3 are top plan and end elevation views of the auger assembly in the position according to FIG. 1.

FIG. 5 is a end elevation view of the auger assembly in the position of FIG. 4.

In the drawings like characters of reference indicate corresponding parts in the different figures.

DETAILED DESCRIPTION

Figure 1:
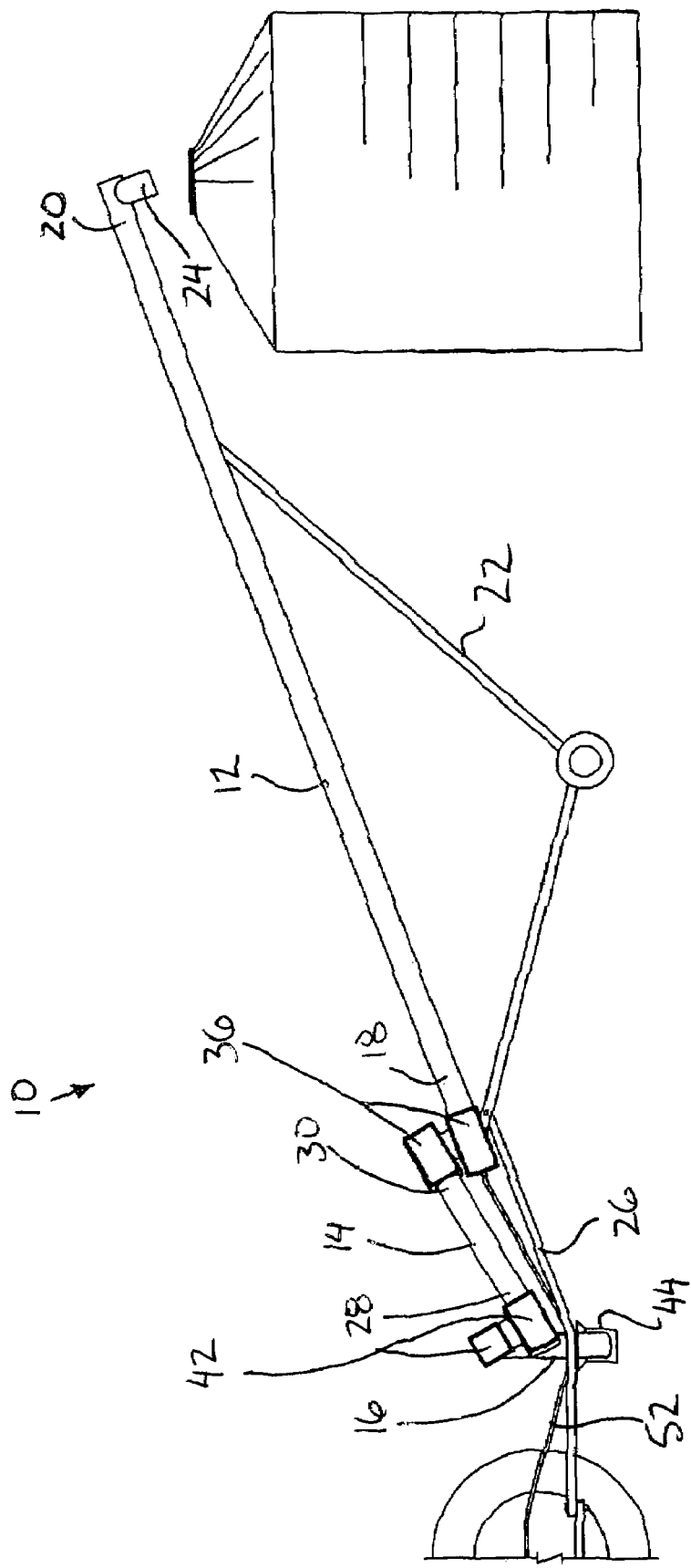
FIG. 1 is side elevation view of the auger assembly according to the present invention.

Referring to the accompanying figures there is illustrated an auger assembly generally indicated by reference numeral 10. The assembly 10 generally comprises a main auger tube 12, an intermediate swing auger tube 14 and a loading swing auger tube 16 connect in series with one another for conveying particulate material therethrough.

The main auger tube 12 is elongate in a longitudinal direction from an inlet end 18 to an outlet end 20 thereof. A main auger is contained within the main auger tube for conveying the material from the inlet to the outlet. A wheeled framed 22 is provided for supporting the main auger for rolling movement along the ground. The frame 22 supports the main auger at an upward inclined towards the outlet which supports a discharge hopper 24 thereon. The frame 22 is similar to conventional frames for grain augers which may include a height adjustment mechanism and the like.

The frame 22 extends in the longitudinal direction of the main tube and includes a hitch bar which extends from the inlet end of the main auger beyond the main auger. The frame 22 slopes downwardly at the same slope as the main auger to meet the hitch bar spaced below the inlet end 18.

The intermediate swing auger tube 14 contains an intermediate auger therein for conveying material therethrough in the longitudinal direction of the tube from inlet end 28 to the outlet end 30 of the intermediate swing auger tube. The outlet end 30 is pivotally coupled to the inlet end of the main auger for pivotal movement about a single axis of rotation extending perpendicularly to the longitudinal direction of each of the tubes 12 and 14 respectively.

A crank arm 32 projects laterally outwardly from the outlet end of the intermediate swing auger tube 14 for connection of a hydraulic actuator 34 coupled between the inlet end 18 of the main auger 12 and the free end of the crank arm 32. Pivotal movement of the intermediate swing auger tube 14 relative to the main auger tube 12 is thus controlled by linear contraction and extension of the actuator 34 which provides some power assistance to the motion.

The intermediate swing auger tube 14 lies parallel to the main auger tube when both lie in a generally common vertical plane wherein the intermediate swing auger tube extends at a downward incline from the inlet end of the main auger tube, at a slope similar to the frame and main auger tube, towards the hitch bar. The intermediate swing auger tube 14 terminates above the hitch bar so that the tube 14 can be pivoted in a side to side lateral motion across the hitch bar of the frame because the inlet 28 at the bottom end is spaced above the hitch bar of the frame.

Two gear boxes 36 are mounted at the outlet 30 of the intermediate swing auger tube 14 and the inlet of the main auger tube 12 respectively for linking the auger shafts of the main auger and intermediate auger for common rotation together. The gear boxes are suitably arranged to maintain a driven connection between the augers as the intermediate swing auger tube is pivoted relative to the main auger tube. In this arrangement rotation of the intermediate auger is driven by rotation of the main auger.

The loading swing auger tube 16 contains a loading auger therein for conveying the particulate material from the inlet end 38 to the outlet end 40 in the longitudinal direction thereof. The outlet end 40 is pivotally connected to the inlet end 28 of the intermediate swing auger tube for relative pivotal movement therebetween. The loading swing auger tube 16 is pivotal about an upright axis perpendicular to both the tubes 14 and 16 as well as being pivotal about a lateral axis at the connection of the loading auger and intermediate auger to permit both side to side pivoting motion and up and down pivoting motion of the loading swing auger tube 16 relative to the intermediate swing auger tube 14.

Two gear boxes 42 similarly couple the shafts of the loading auger and intermediate auger at the tubes 14 and 16 respectively. The gear boxes 42 are arranged to maintain a linked connection between the loading auger and the intermediate auger as the loading swing tube is pivoted relative to the intermediate swing auger tube so that rotation of the loading auger is driven off of rotation of the intermediate auger which is in turn driven by rotation of the main auger.

The loading swing auger tube 16 is supported substantially below the main auger tube in elevation with the inlet end 38 being positioned below the hitch bar of the frame, adjacent the ground. A loading hopper 44 is mounted at the inlet end 38 to receive the particulate material discharged from the source area to be conveyed to the target area.

The loading hopper includes an enclosed bottom 46 with four side walls 48 extending upwardly therefrom to an open top end 50. The bottom and side walls fully surround the inlet end 38 of the loading auger. Either the inlet hopper is pivotal relative to the loading swing auger tube 16 or the loading swing auger tube 16 is pivotal relative to the gear box which couples it to the intermediate swing auger tube, or a combination thereof to ensure that the loading hopper 44 is pivotal about the longitudinal axis of the loading auger relative to the gearboxes 42. In this arrangement the loading hopper has three degrees of freedom to permit the loading hopper to remain level as it is displace anywhere along the ground about the inlet end of the main auger.

A drive line 52 couples through the gear boxes 36 for directly driving the main auger within the main auger tubes. It is desirable to drive the main auger directly as the main auger is typically much longer then the intermediate swing auger tube and the loading swing auger tubes combined. The drive line 52 extends near the frame at a downward slope below the intermediate swing auger tube at a similar incline thereto up to the hitch bar of the frame to ensure that there is sufficient clearance for the intermediate swing auger tube to be pivotally displaced across the drive line 52 as well. The drive line 52 continues along the hitch bar towards the hitch at the free end thereof which connects to the towing vehicle. The free end of the drive line 52 includes a suitable coupling 54 thereon of the type which readily connects the power takeoff shaft connector of the towing vehicle so that all of the augers can be commonly driven through the gear boxes by the power takeoff of the towing vehicle.

In use, the augers are operated commonly by driving rotation thereof so that material received in the loading hopper is conveyed through the loading swing auger tube to the intermediate swing auger tube and in turn to the main auger tube which discharges the material at the outlet end thereof. Typically the auger assembly is moved about on its wheeled frame for first aligning the main auger with the target area. Once in position a transport container comprising source particulate material is positioned along side the auger assembly.

Figure 6:
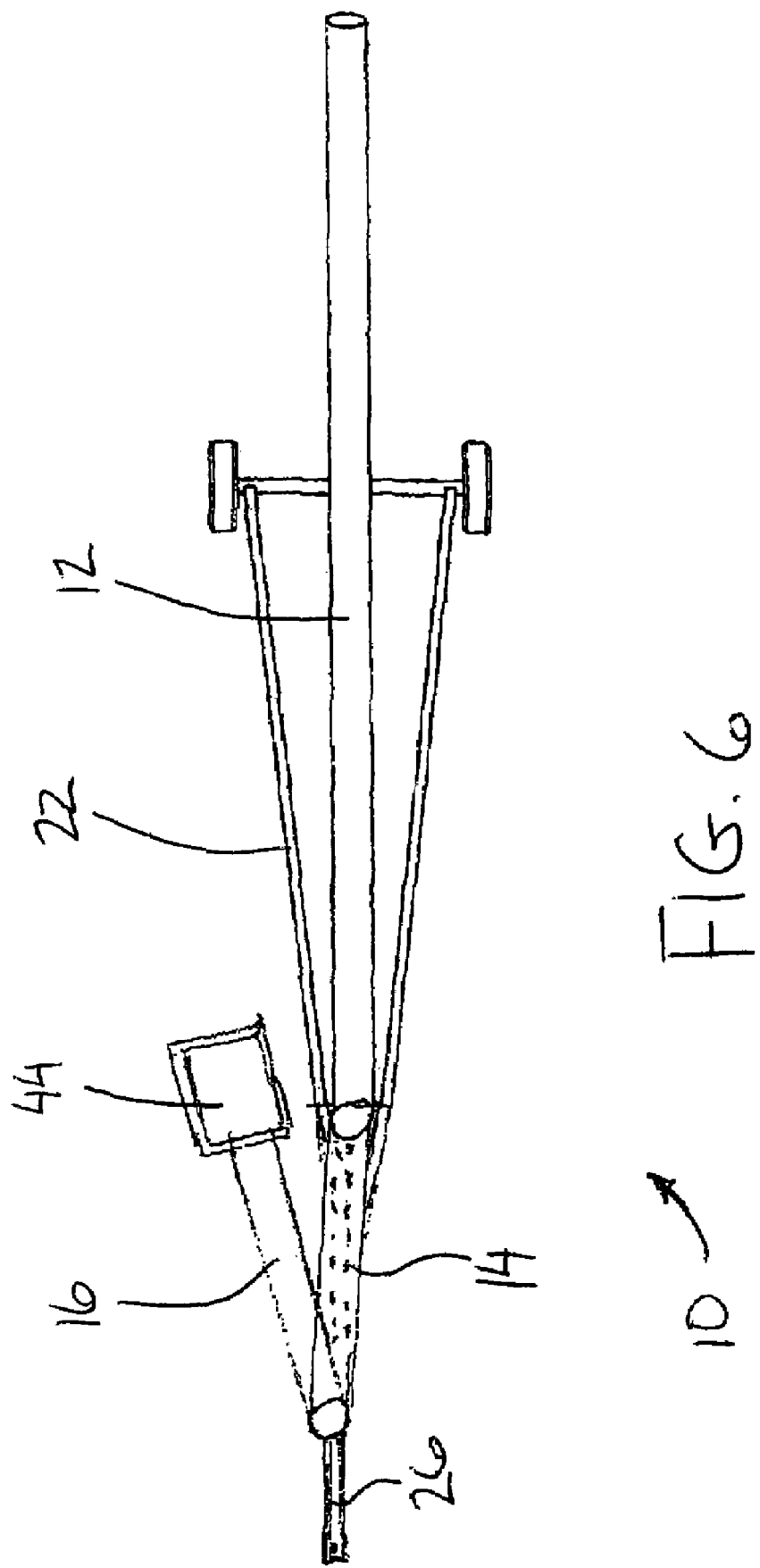
FIG. 6 is a top plan view of the auger assembly in a transport position.
Figure 7:
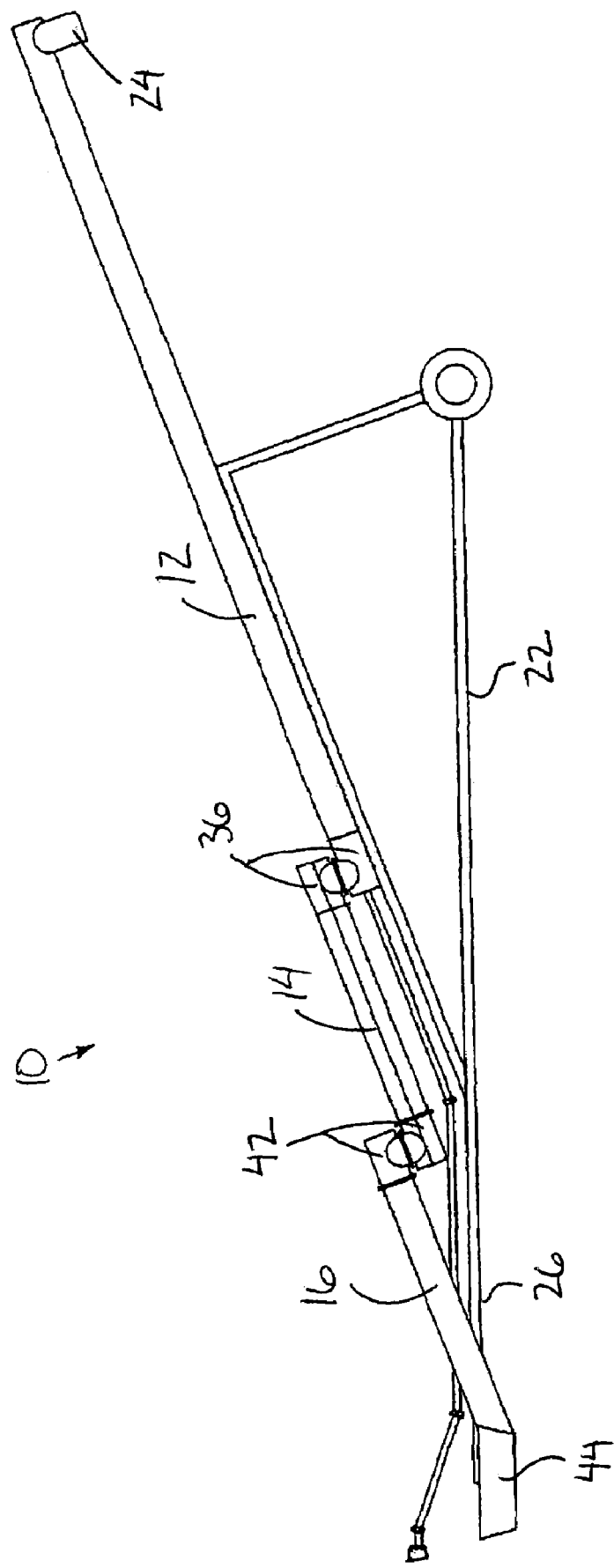
FIG. 7 is a side elevation view of the auger assembly in a fully extended position.

By pivoting both the loading swing auger tube relative to the intermediate swing auger tube and the intermediate swing auger tube relative to the main auger tube, the loading hopper at the inlet end of the loading swing auger tube can be positioned below the discharge hopper of the source material. For transport, it may be desirable to position the swing auger tubes as illustrated in FIG. 6 in which the intermediate swing auger tube and the main auger tube are positioned end to end substantially in the longitudinal direction and the loading swing auger tube extends along side the intermediate swing auger tube from the inlet thereof towards the main auger tube. The hitch bar extends beyond the inlet of the main auger tube longer than the intermediate swing auger tube so that the hitch at the free end thereof is unobstructed for connection to the towing vehicle.

Figure 2:
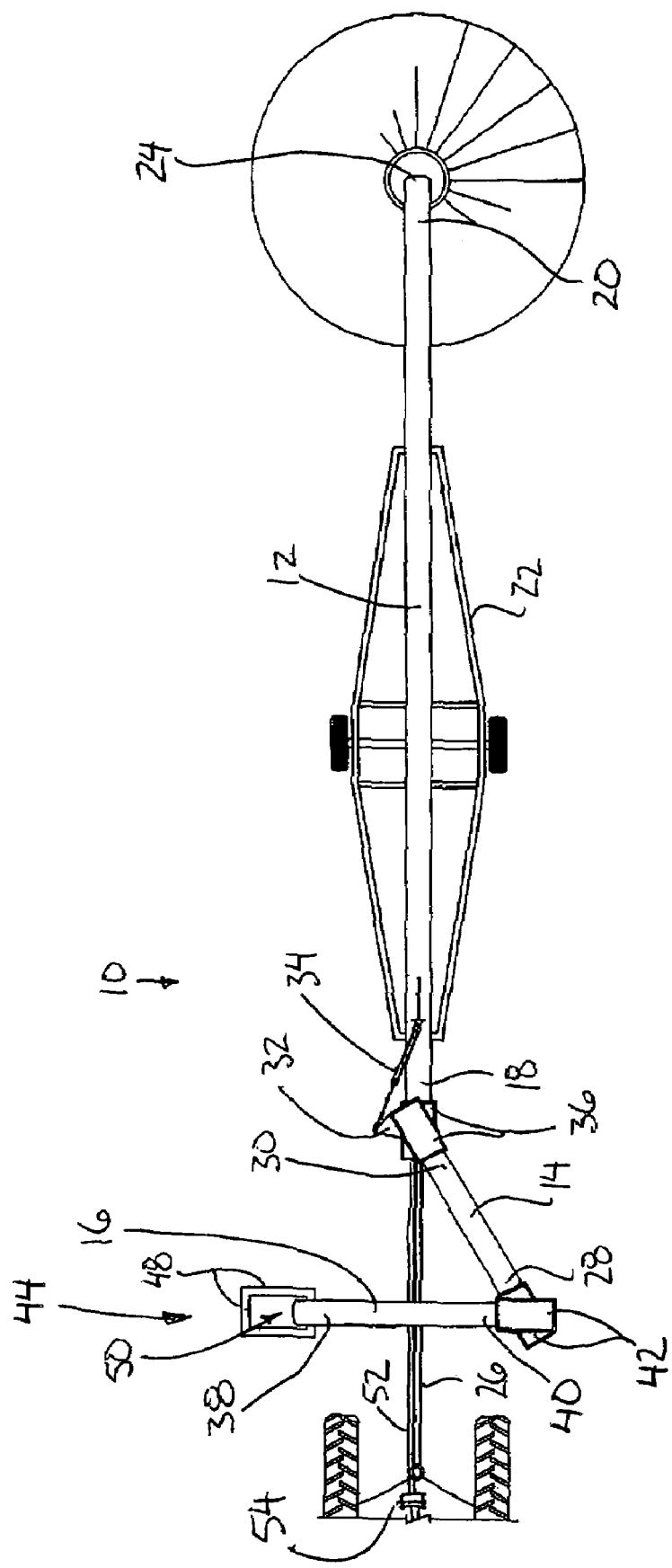
Figure 4:
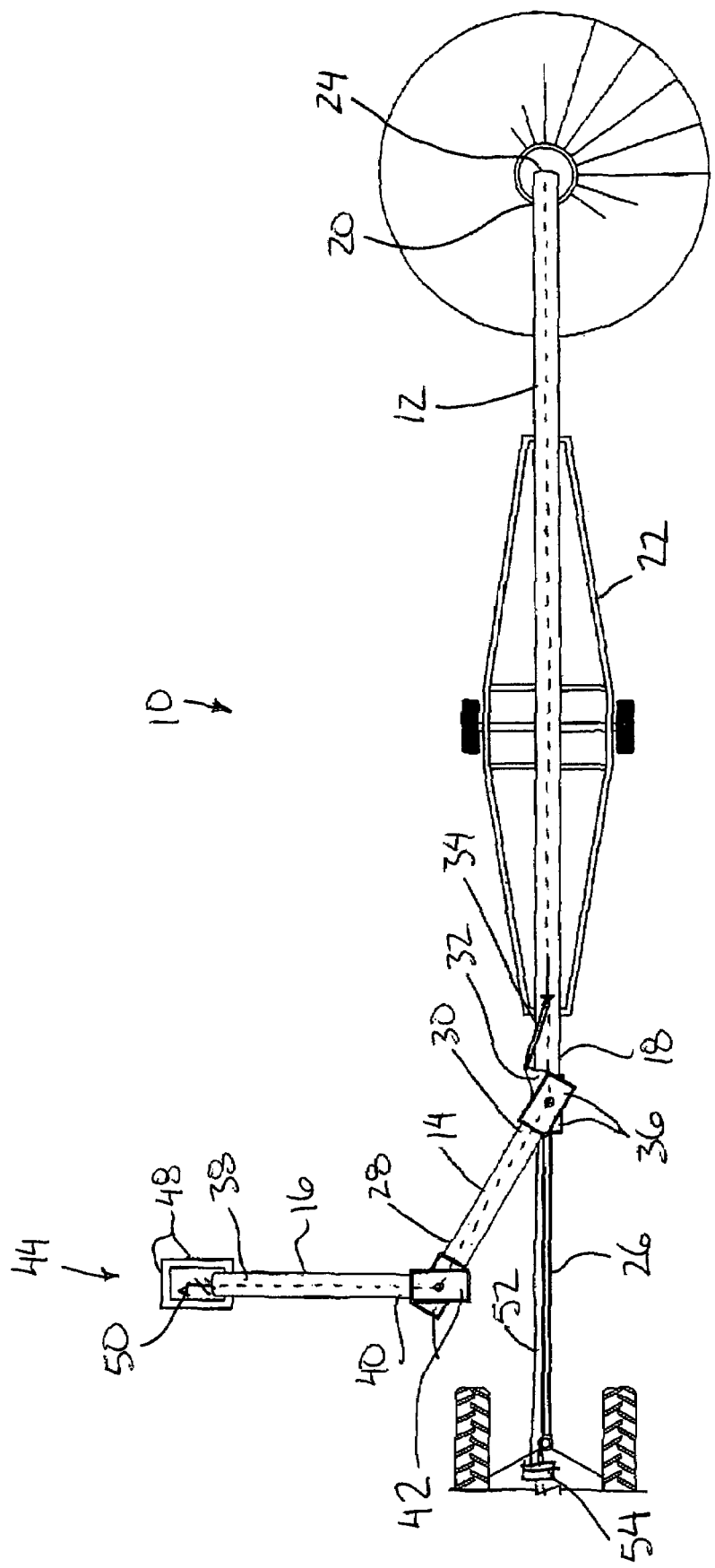
FIG. 4 is a top plan view of the auger assembly in which the inlet hopper has been displaced in a liner direction perpendicular to the main auger in relation to the position shown in FIG. 2.

Alternatively the swing auger tubes may be pivotal into a loading position in which the loading swing auger tube extends across the frame in a loading direction, as illustrated in FIG. 2, in which the loading auger lies perpendicularly to the longitudinal direction of the main auger tube. In this position the loading swing auger tube is moveable in the loading direction towards the position illustrated in FIG. 4, by simple pivoting the intermediate swing auger to relative the main auger tube. The loading hopper at the inlet of the loading swing auger tube can thus be displaced substantially linearly in a lateral direction of the main auger for insertion within narrow spaces such as when accessing the discharge hopper of a transport container which is confined between two wheel sets below the container.

When positioned as shown in FIG. 1 through 3, in which the intermediate swing auger tube extends at an incline in a first lateral direction from the frame and the loading swing auger tube extends back across the frame in an opposing lateral direction, pivoting the intermediate swing auger tube further away from the frame supporting the main auger tube thereon causes the loading swing auger tube to ride up on the hitch bar for automatically lifting the loading hopper up off the ground.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An auger assembly comprising:
    a main auger tube having an inlet end and an outlet end;
    a main auger contained within the main auger tube and arranged to rotate to transport material from the inlet end to the outlet end of the main auger tube;
    an intermediate swing auger tube having an inlet end and an outlet end;
    an intermediate auger contained within the intermediate swing auger tube and arranged to rotate to transport material from the inlet end to the outlet end of the intermediate swing auger tube;
    the outlet end of the intermediate swing auger tube being pivotally coupled to the inlet of the main auger tube such that the intermediate swing auger tube is pivotal relative to the main auger tube and such that material from the intermediate swing auger tube is discharged to the main auger tube;
    a loading swing auger tube having an inlet end and an outlet end;
    a loading auger contained within the loading swing auger tube and arranged to rotate to transport material from the inlet end to the outlet end of the loading swing auger tube;
    the outlet end of the loading swing auger tube being pivotally coupled directly to the inlet of the intermediate swing auger tube such that:
        the loading swing auger tube is pivotal relative to the intermediate swing auger tube;
        material from the loading swing auger tube is discharged to the intermediate swing auger tube; and
        pivotal movement between the intermediate swing auger tube and the loading swing auger tube is permitted about at least two different axes;
    one of said at least two different axes comprising an upright axis such that the loading swing auger tube is pivotal relative to the intermediate swing auger tube in a side to side pivoting motion; and
    one of said at least two different axes comprising a lateral axis such that the loading swing auger tube is pivotal relative to the intermediate swing auger tube in an up and down pivoting motion; and
    a loading hopper having an open top end coupled to the inlet of the loading swing auger tube for loading the material through the open top end of the loading hopper.

2. The auger assembly according to claim 1 wherein the augers are operable to rotate as the auger tubes are pivoted relative to one another.

3. The auger assembly according to claim 1 wherein there are provided gearboxes coupling the main auger to the intermediate auger and coupling the intermediate auger to the loading auger such that the augers are commonly driven.

4. The auger assembly according to claim 1 wherein main auger tube is longer than the intermediate swing auger tube and the loading swing auger tube combined.

5. The auger assembly according to claim 1 wherein pivotal movement between the main auger tube and the intermediate swing auger tube is permitted only about one axis.

6. The auger assembly according to claim 1 wherein the main auger tube is supported on a wheeled frame supported for rolling movement in a longitudinal direction of the frame and the main auger tube supported thereon.

7. The auger assembly according to claim 6 wherein the wheeled frame includes a hitch for connection to a towing vehicle and wherein the intermediate swing auger tube is supported for pivotal movement across the hitch.

8. The auger assembly according to claim 7 wherein the inlet of the loading swing auger tube is lower in elevation than the hitch.

9. A method of transferring particulate material from a source area to a target area, the method comprising:
   providing an auger assembly including a main auger rotatable within a main auger tube, an intermediate auger rotatable within an intermediate auger tube and a loading auger rotatable within a loading auger tube;
   connecting the augers in series with one another by connecting the auger tubes in series with one another for relative pivotal movement in which the main auger tube is supported on a main frame, the intermediate auger tube is pivotal relative to the main auger tube and the loading auger tube is pivotal relative to the intermediate auger tube;
   aligning an outlet end of the main auger tube with the target area;
   positioning an inlet end of the loading auger tube below the source area by pivoting both the loading auger tube relative to the intermediate auger tube and the intermediate auger tube relative to the main auger tube;
   providing a power assisted drive connected between the intermediate auger tube and the main auger tube;
   using the power assisted drive to drive pivotal movement of the intermediate auger tube relative to the main auger tube;
   pivoting the loading auger tube relative to the intermediate auger tube independently of the intermediate auger tube being pivoted relative to the main auger tube; and
   driving rotation of the augers within the respective auger tubes to convey the particulate material from the inlet of the loading auger tube to the outlet of the main auger tube; and
   pivoting the auger tubes relative to one another independently of rotation of the augers.

10. The method according to claim 9 including commonly driving rotation of the augers.

11. The method according to claim 9 including supporting the loading auger tube for free pivotal movement relative to the intermediate auger tube about at least two different axes.

12. The method according to claim 11 including permitting pivotal movement of the intermediate auger tube relative to the main auger tube only about a single axis.

13. The method according to claim 9 including supporting the main frame for rolling movement along the ground and providing a towing hitch on the main frame.

14. The method according to claim 9 including pivoting the auger tubes into a transport position in which the intermediate auger tube and the main auger tube are end to end substantially parallel to one another and in which the loading auger tube extends alongside the intermediate auger tube towards the main auger tube.

15. The method according to claim 9 including pivoting the auger tubes into a loading position in which the loading auger tube extends across the main frame in a loading direction perpendicularly to a longitudinal direction of the main auger tube and in which the loading auger tube is movable in the loading direction by pivoting the intermediate auger tube relative to the main auger tube.

16. The auger assembly according to claim 1 wherein pivotal movement of the intermediate auger tube relative to the main auger tube is power assisted by a hydraulic actuator coupled between the intermediate auger tube and the main auger tube for controlling relative pivotal movement therebetween.

17. The auger assembly according to claim 16 wherein the loading auger tube is freely pivoted relative to the intermediate auger tube.

18. The auger assembly according to claim 1 wherein each auger tube extends upward from the inlet end to the outlet end.

19. The method according to claim 9 wherein each auger tube extends upward from the inlet end to the outlet end.

20. An auger assembly comprising:
   a main auger tube having an inlet end and an outlet end;
   a wheeled frame supporting the main auger tube thereon so as to be arranged for rolling movement along the ground;
   the main auger tube being supported on the wheeled frame to extend at an upward incline from the inlet end to the outlet end of the main auger tube;
   a main auger contained within the main auger tube and arranged to rotate to transport material from the inlet end to the outlet end of the main auger tube;
   an intermediate swing auger tube having an inlet end and an outlet end;
   an intermediate auger contained within the intermediate swing auger tube and arranged to rotate to transport material from the inlet end to the outlet end of the intermediate swing auger tube;
   the outlet end of the intermediate swing auger tube being pivotally coupled to the inlet of the main auger tube such that the intermediate swing auger tube is pivotal relative to the main auger tube and such that material from the intermediate swing auger tube is discharged to the main auger tube;
   the intermediate swing auger tube and the main auger tube being coupled such that relative pivotal movement therebetween is permitted only about a single axis;
   a loading swing auger tube having an inlet end and an outlet end;
   a loading auger contained within the loading swing auger tube and arranged to rotate to transport material from the inlet end to the outlet end of the loading swing auger tube;
   the outlet end of the loading swing auger tube being pivotally coupled to the inlet of the intermediate swing auger tube such that material from the loading swing auger tube is discharged to the intermediate swing auger tube;
   the loading swing auger tube being freely pivotal relative to the intermediate swing auger tube;
   the loading swing auger tube being pivotal relative to the intermediate swing auger tube about at least two different axes comprising an upright axis and a lateral axis such that the loading swing auger is pivotal relative to the intermediate swing auger tube about the upright axis in a side to side motion and about the lateral axis in an up and down motion;
   a loading hopper having an open top end coupled to the inlet of the loading swing auger tube, the loading hopper being arranged for loading the material through the open top end of the loading hopper;
   the augers being operable to rotate within the respective auger tubes as the auger tubes are pivoted relative to one another; and
   a drive connected between the intermediate auger tube and the main auger tube, the drive being arranged to drive pivotal movement of the intermediate auger tube relative to the main auger tube about the single axis.

21. The auger assembly according to claim 20 wherein the hopper is pivotal relative to the intermediate swing auger tube about a longitudinal axis of the loading swing auger tube.

* * * * *